United States Patent
Fan et al.

(10) Patent No.: US 11,388,767 B2
(45) Date of Patent: Jul. 12, 2022

(54) NETWORK CONNECTION METHOD, DEVICE AND APPARATUS

(71) Applicant: BEIJING XIAOMI MOBILE SOFTWARE CO., LTD., Beijing (CN)

(72) Inventors: Dian Fan, Beijing (CN); Zheng Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/006,884

(22) Filed: Aug. 30, 2020

(65) Prior Publication Data

US 2021/0176809 A1    Jun. 10, 2021

(30) Foreign Application Priority Data

Dec. 5, 2019    (CN) .................. 201911236891.X

(51) Int. Cl.
| | |
|---|---|
| *H04W 76/00* | (2018.01) |
| *H04W 76/18* | (2018.01) |
| *H04W 4/80* | (2018.01) |
| *H04W 76/11* | (2018.01) |
| *H04W 12/06* | (2021.01) |
| *H04W 12/037* | (2021.01) |
| *H04L 12/28* | (2006.01) |

(52) U.S. Cl.
CPC ......... *H04W 76/18* (2018.02); *H04L 12/2803* (2013.01); *H04W 4/80* (2018.02); *H04W 12/037* (2021.01); *H04W 12/068* (2021.01); *H04W 76/11* (2018.02); *H04L 2012/2841* (2013.01)

(58) Field of Classification Search
CPC ....... H04W 76/18; H04W 76/11; H04W 4/80; H04W 12/068; H04W 12/037; H04L 12/2803; H04L 2012/2841
See application file for complete search history.

(56) References Cited

U.S. PATENT DOCUMENTS

| | | | |
|---|---|---|---|
| 7,870,153 B2 * | 1/2011 | Croft .................. | G06F 9/45533 707/781 |
| 9,307,344 B2 * | 4/2016 | Rucker ................ | H04W 48/18 |

(Continued)

FOREIGN PATENT DOCUMENTS

| | | |
|---|---|---|
| CN | 105228141 A | 1/2016 |
| CN | 106341815 A | 1/2017 |

(Continued)

OTHER PUBLICATIONS

Extended European Search Report of European Application No. 20210094.7 dated Apr. 30, 2021.

(Continued)

*Primary Examiner* — Khai M Nguyen
(74) *Attorney, Agent, or Firm* — Syncoda LLC; Feng Ma

(57) ABSTRACT

A network connection method includes: establishing a backup connection between a smart device and a network access device when the smart device fails to establish a network connection with the network access device due to incorrect networking verification information; receiving updated networking verification information sent by the network access device through the backup connection; and establishing the network connection with the network access device by using the updated networking verification information.

18 Claims, 6 Drawing Sheets

Establishing a backup connection with a smart device according to received relevant information in a predetermined format, when determining according to the relevant information that the smart device fails to establish a network connection with a network access device due to incorrect networking verification information — 302

Sending the updated networking verification information to the smart device through the backup connection, so that the smart device establishes the network connection with the network access device by using the updated networking verification information — 304

(56) References Cited

U.S. PATENT DOCUMENTS

| | | | |
|---|---|---|---|
| 11,252,229 B2* | 2/2022 | Kim | H04W 12/50 |
| 2015/0071052 A1* | 3/2015 | Hershberg | H04W 24/04 |
| | | | 370/216 |

FOREIGN PATENT DOCUMENTS

| | | | |
|---|---|---|---|
| CN | 107087291 A | 8/2017 | |
| CN | 107181791 A | 9/2017 | |
| CN | 109495979 A | 3/2019 | |
| CN | 110099427 A | 8/2019 | |
| CN | 110602692 A | 12/2019 | |
| KR | 20140001499 A | 1/2014 | |

OTHER PUBLICATIONS

1st Office Action of Chinese Application No. 201911236891.X dated Jun. 3, 2021.

* cited by examiner

NETWORK CONNECTION METHOD, DEVICE AND APPARATUS

CROSS-REFERENCE TO RELATED APPLICATIONS

This application claims priority to Chinese Patent Application No. 201911236891.X filed on Dec. 5, 2019, the disclosure of which is hereby incorporated by reference in its entirety.

BACKGROUND

Internet of Things (IOT) combines various information sensing devices with internet to form a huge network, so that various items can be connected to the network for easy identification and management. With the development of smart home and Internet of Things technologies, types of smart devices based on wireless networks are increasing. After connecting the smart devices (such as smart home appliances) to the Internet of Things, users can remotely and intelligently control the smart devices and thus have real smart home experience.

SUMMARY

The present disclosure generally relates to the field of terminal technology, and in particular, to a network connection method, device and apparatus.

According to a first aspect of embodiments of the present disclosure, there is provided a network connection method, including: establishing a backup connection between a smart device and a network access device when the smart device fails to establish a network connection with the network access device due to incorrect networking verification information, wherein the backup connection is a communication connection different from the network connection; receiving updated networking verification information sent by the network access device through the backup connection; and establishing the network connection with the network access device by using the updated networking verification information.

In some embodiments, the networking verification information includes one or more of a wireless network service set identifier (SSID) and a wireless network connection password.

In some embodiments, the step of establishing a backup connection between a smart device and a network access device includes: broadcasting relevant information in a predetermined format for establishing the backup connection, so that the network access device establishes the backup connection with the smart device according to the relevant information when detecting the relevant information in the predetermined format.

In some embodiments, the network connection method further includes: receiving identifier information in synchronization with that the network access device receives the identifier information, before the network connection established by using the networking verification information is disconnected between the smart device and the network access device. The identifier information is fed back by a server side, and is configured for the network access device to verify validity of the smart device before the network access device sends the updated networking verification information to the smart device.

In some embodiments, the network connection method further includes: sending, to the network access device, a request for obtaining the updated networking verification information, before receiving the updated networking verification information sent by the network access device through the backup connection. The request is encrypted by using the identifier information or carries the identifier information.

In some embodiments, the network connection method further includes: disconnecting the backup connection with the network access device, after establishing the network connection with the network access device.

According to a second aspect of the present disclosure, there is provided a network connection method, including: establishing a backup connection with a smart device according to received relevant information in a predetermined format, when determining according to the relevant information that the smart device fails to establish a network connection with a network access device due to incorrect networking verification information, wherein the backup connection is a communication connection different from the network connection; and sending updated networking verification information to the smart device through the backup connection, so that the smart device establishes the network connection with the network access device by using the updated networking verification information.

In some embodiments, the network connection method further includes: receiving identifier information fed back by a server side in synchronization with that the smart device receives the identifier information, before the network connection established by using the networking verification information is disconnected between the smart device and the network access device; and verifying validity of the smart device by using the identifier information, before sending the updated networking verification information to the smart device through the backup connection.

According to a third aspect of the present disclosure, there is provided a network connection device, including: a backup connection module, configured to establish a backup connection between a smart device and a network access device when the smart device fails to establish a network connection with the network access device due to incorrect networking verification information, wherein the backup connection is a communication connection different from the network connection; an information transmission module, configured to receive updated networking verification information sent by the network access device through the backup connection; and a network connection module, configured to establish the network connection with the network access device by using the updated networking verification information.

In some embodiments, the backup connection module is specifically configured to: broadcast relevant information in a predetermined format for establishing the backup connection, so that the network access device establishes the backup connection with the smart device according to the relevant information when detecting the relevant information in the predetermined format.

In some embodiments, the network connection device further includes: an identifier synchronization module, configured to receive identifier information in synchronization with that the network access device receives the identifier information, before the network connection established by using the networking verification information is disconnected between the smart device and the network access device. The identifier information is fed back by a server side, and is configured for the network access device to verify validity of the smart device before the network access device sends the updated networking verification information to the smart device.

In some embodiments, the information transmission module is further configured to: send, to the network access device, a request for obtaining the updated networking verification information, before receiving the updated networking verification information sent by the network access device through the backup connection. The request is encrypted by using the identifier information or carries the identifier information.

In some embodiments, the backup connection module is further configured to: disconnect the backup connection with the network access device, after establishing the network connection with the network access device.

According to a fourth aspect of embodiments of the present disclosure, there is provided a network connection device, including: a backup connection module, configured to establish a backup connection with a smart device according to received relevant information in a predetermined format, when it is determined according to the relevant information that the smart device fails to establish a network connection with a network access device due to incorrect networking verification information, wherein the backup connection is a communication connection different from the network connection; and an information transmission module, configured to send updated networking verification information to the smart device through the backup connection, so that the smart device establishes the network connection with the network access device by using the updated networking verification information.

In some embodiments, the network connection device further includes: an identifier synchronization module, configured to receive identifier information fed back by a server side in synchronization with that the smart device receives the identifier information, before the network connection established by using the networking verification information is disconnected between the smart device and the network access device; and a verifying module, configured to verify validity of the smart device by using the identifier information, before the updated networking verification information is sent to the smart device through the backup connection.

According to a fifth aspect of embodiments of the present disclosure, there is provided a smart device, including: a processor; and a memory, having stored instructions executable by the processor, wherein the instructions, when being executed by the processor, cause the processor to implement the steps in the network connection method according to any item in the first aspect.

According to a sixth aspect of embodiments of the present disclosure, there is provided a network access device, including: a processor; and a memory, having stored instructions executable by the processor, wherein the instructions, when being executed by the processor, cause the processor to implement the steps in the network connection method according to any item in the second aspect.

It should be noted that the above general description and the following detailed description are merely exemplary and explanatory and should not be construed as limiting of the present disclosure.

BRIEF DESCRIPTION OF THE DRAWINGS

The drawings herein are incorporated into the specification and constitute a part of the specification, show embodiments consistent with the present disclosure, and servers, together with the specification, to explain the principle of the present disclosure.

DETAILED DESCRIPTION

Figure 1:
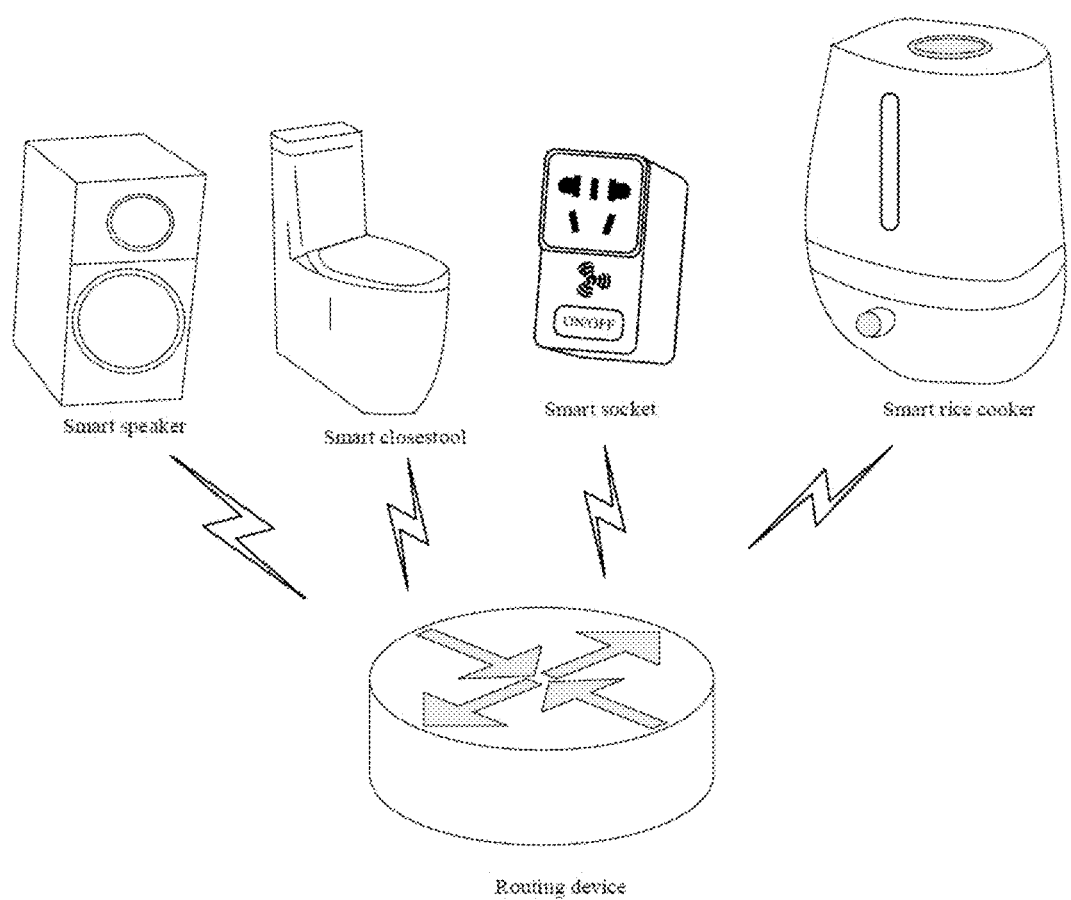
FIG. 1 is an application scenario diagram of a network connection method according to some embodiments.

Exemplary embodiments will be described in detail herein, examples of which are shown in the drawings. When the following description is made with reference to the accompanying drawings, the same numerals in different drawings represent the same or similar elements unless otherwise indicated. The embodiments described in the following exemplary embodiments do not represent all embodiments consistent with the present disclosure. Rather, they are merely examples of devices and methods consistent with some aspects of the present disclosure as recited in the appended claims.

The term used in the present disclosure is for describing specific embodiments only, and is not intended to limit the present disclosure. Singular forms "a", "said" and "the" used in the present disclosure and the appended claims are also intended to include plural forms unless the context clearly indicates otherwise. It should also be understood that the term "and/or" as used herein refers to and includes any or all possible combinations of one or more associated and listed items.

It should be understood that although terms such as first, second, third and the like may be used to describe various information in the present disclosure, the information should not be limited by these terms. These terms are only used to distinguish the same type of information from each other. For example, without departing from the scope of the present disclosure, first information may be referred to as second information, and similarly, the second information may be referred to as the first information. Depending on the context, the word "if" as used herein may be interpreted as "when" or "when" or "in response to determining".

In the related art, if networking verification information, such as service set identifier (SSID) or connection password of the network, of a routing device is modified, the modified networking verification information needs to be input to a smart device, and then the smart device can use the modified networking verification information to be reconnected to the wireless network. When there are a large number of smart devices, it is necessary to input the modified networking verification information to each of the smart devices, which is obviously inefficient.

Embodiments of the present disclosure relate to a scenario where a smart device is connected to a network through a network access device. The smart device may include mobile terminals such as smartphones, tablets, personal digital assistants (PDAs), e-book readers, multimedia players, or Internet of Things (IOT) devices. For example, it may be smart home devices such as smart switches, smart speakers, smart refrigerators, smart fans, and smart lights. The network access device may be a device for accessing network resources such as a routing device, a multiplexer, and a modulation regulator, which is not limited in the present disclosure. The Internet of Things scenario is illustrated as an example for understanding. FIG. 1 shows an application scenario diagram of a network connection method according to an exemplary embodiment of the present disclosure. As shown in FIG. 1, smart home devices such as a smart speaker, a smart toilet, a smart socket and a smart rice cooker may be connected to a same routing device, and different smart home devices with a same account may be controlled by a control terminal.

In the related art, for example, when a smart device is a mobile terminal, and networking verification information is modified, a user shall manually input the updated networking verification information, and then the smart device can use the updated network verification information to access network through a network access device.

For example, when the smart device is an Internet of Things device, in order to connect the smart device to a wireless network, generally, a terminal is controlled to scan surrounding wireless hotspots first, and then a user determines whether there is a hotspot of the smart device in the scanned wireless hotspots. If it is determined that there is the hotspot of the smart device, the user connects the control terminal to the hotspot of the smart device by clicking on the hotspot of the smart device, and then sends name and password of a router to the smart device by entering the name and password of the router in the control terminal, so that the smart device can be connected to the wireless network according to the received name and password of the router. It can be seen that when the networking verification information for the smart device to access the network is modified, the operation of connecting the smart device to the network through the network access device is tedious and time-consuming.

Even if the updated networking verification information is sent to the smart device before the network connection, that is established by using the networking verification information, is disconnected between the smart device and the network access device, the smart device may fail to receive the updated networking verification information in such period due to offline factors such as power-off and network outage, and thus cannot be connected to the network access device after the updated networking verification information takes effect.

Therefore, embodiments of the present disclosure provide a network connection method, in which a communication connection may be established between a smart device and a network access device by using at least two connection methods. Compared with the network connection as a main connection method, other connections may be referred to as backup connections. The smart device establishes the backup connection with the network access device when the smart device fails to establish the network connection with the network access device due to incorrect networking verification information, receives the updated networking verification information sent by the network access device through the backup connection and then establishes the network connection with the network access device by using the updated networking verification information. Therefore, the networking verification information in the smart device is updated automatically, and the network connection is established automatically between the smart device and the network access device, which does not need user participation, and thus is simple in operation and saves time.

Figure 2:
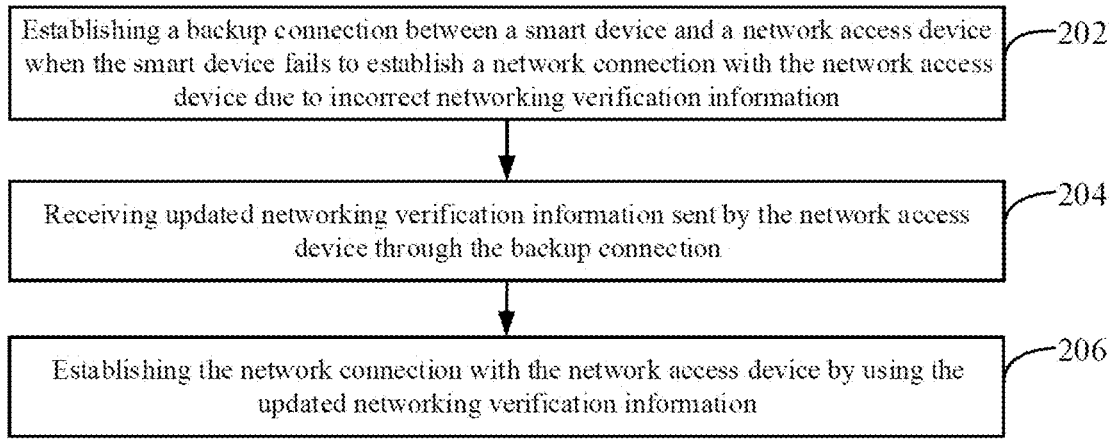
FIG. 2 is a schematic diagram of a network connection method according to an exemplary embodiment of the present disclosure.

FIG. 2 is a schematic diagram of a network connection method according to an exemplary embodiment of the present disclosure. As shown in FIG. 2, the method includes:

Step 202, establishing a backup connection between a smart device and a network access device when the smart device fails to establish a network connection with the network access device due to incorrect networking verification information, wherein the backup connection is a communication connection different from the network connection;

Step 204, receiving updated networking verification information sent by the network access device through the backup connection; and Step 206, establishing the network connection with the network access device by using the updated networking verification information.

For example, the network connection method may be applied to a smart device. The following mainly describes the network connection from the smart device side by using that the method is applied to the smart device as an example.

In some embodiments of the present disclosure, the smart device may communicate with the network access device through at least two connection methods. The smart device and the network access may communicate with each other through another connection method when the smart device fails to establish the network connection with the network access device due to incorrect networking verification information, so that the network access device may send the updated networking verification information to the smart device, and thus the smart device can establish the network connection with the network access device by using the updated networking verification information. Therefore, the smart device can automatically access the network when the networking verification information is updated.

The networking verification information is information required by the smart device to access the network through the network access device. For example, the networking verification information may include one or more of a service set identifier (SSID) of a wireless network and a connection password of the wireless network. It can be understood that, if other information is needed to access the network, the networking verification information may also include the other information required for accessing the network, which will not be described in detail herein.

There may be many factors resulting in failure of establishing the network connection between the smart device and the network access device, for example, the smart device exits the network connection or the smart device is powered off. In some embodiments of the present disclosure, in the case where the smart device cannot establish the network connection with the network access device due to incorrect networking verification information, the smart device actively establishes the backup connection with the network access device to receive the updated networking verification information through the backup connection.

As how to determine whether the failure of establishing the network connection between the smart device and the network access device is caused by the incorrect networking verification information, for example, after the network connection is disconnected between the smart device and the network access device, the smart device may send a network connection request to the network access device, and if the network access device does not respond, it may determine that the smart device cannot establish the network connection with the network access device due to the incorrect networking verification information.

The backup connection is a communication connection different from the network connection. For example, the backup connection includes a short-range communication connection. The short-range communication connection may be a Bluetooth connection, so that when the smart device cannot establish the network connection with the network access device due to the incorrect networking verification information, the smart device establishes the Bluetooth connection with the network access device to communicate with the network access device.

The backup connection may be established between the smart device and the network access device by initiating a backup connection establishment request by the smart device or the network access device.

For example, the process of establishing the backup connection between the smart device and the network access device includes: broadcasting relevant information in a predetermined format for establishing the backup connection, so that the network access device establishes the backup connection with the smart device according to the relevant information when detecting the relevant information in the predetermined format.

In some embodiments, the predetermined format is used to characterize that the broadcast is initiated when the smart device cannot establish the network connection with the network access device due to the incorrect networking verification information, so that the network access device establishes the backup connection with the smart device according to the relevant information when detecting the relevant information in the predetermined format, so as to prevent the network access device from mistakenly connecting an unrelated smart device.

For example, the relevant information in the predetermined format may refer to that the relevant information carries a specified identifier. The specified identifier may be used to indicate that the relevant information is initiated when the smart device can not establish the network connection with the network access device due to the incorrect network verification information. It should be understood that the relevant information in the predetermined format may be in another manner as long as the network access device can distinguish the relevant information sent under different conditions, which is not limited herein.

In some scenarios, one network access device may be connected to one or more smart devices at the same time. When the number of smart devices to establish the backup connection with the network access device exceeds the number of smart devices that the network connection device is able to connect, for example, when the number of smart home devices is relatively large, the sequence in which the smart devices establish the backup connection with the network access device may be determined according to the time when the smart device initiates the backup connection request.

In some scenarios, illegal users may use the network without authority through the smart device. For this reason, the network access device may verify validity of the smart device before the network access device sends the updated networking verification information to the smart device. Only when the verification is passed, the network access device sends the updated networking verification information to the smart device. In some embodiments, the method may further include: receiving identification information fed back by a server side in synchronization with that the network access device receives the identification information before the network connection established by using the networking verification information is disconnected between the smart device and the network access device, so that the network access device verifies validity of the smart device before the network access device sends the updated networking verification information to the smart device.

This process can be used as a precondition of that the network access device sends the updated networking verification information to the smart device. The smart device may be configured to be connected to the network access device by using networking verification information to access the network, and then can interact with the server side. When the smart device is legitimate, the server side can periodically synchronize the identifier information to the smart device and the network access device. The identifier information is used to verify the validity of the smart device. In one example, the identifier information may be Token. In an Internet of Things scenario, the server side can determine whether the smart device is legitimate by verifying whether the smart device and the network access device belong to the same account, and then determine whether to periodically synchronize the identifier information to the network access device and the smart device. It can be understood that other means can also be used to verify whether the smart device is legitimate, for example, to verify whether the smart device is legitimate by determining whether the identifier of the smart device exists in a pre-stored set of legitimate identifiers, which is not limited herein.

In order to verify the validity of the smart device by the network access device, after the network access device establishes the backup connection with the smart device, a request for obtaining the updated networking verification information may be sent to the network access device. The request carries the identifier information. After receiving the request carrying the identifier information, the network access device may use the identifier information to verify the validity of the smart device.

In some scenarios, in order to ensure the security of the request, the request may be encrypted by using the identifier information, so as to realize that the request is obtained through encryption using the identifier information, thereby ensuring the security of the request during transmission. After the network access device uses the stored identifier information to successfully decrypt the request, the smart device may be considered legitimate.

After verifying that the smart device is legitimate, the network connection device may send the updated networking verification information to the smart device, so that the smart device uses the updated networking verification information to establish the network connection with the network access device.

In one example, in order to ensure the security of the updated networking verification information, the updated networking verification information may be encrypted using the identifier information and transmitted to the smart device. That is, the updated network verification information is obtained through encryption using the identifier information. The smart device decrypts the encrypted information, and establishes the network connection with the network access device using the decrypted information to access the network. Therefore, the networking verification information is automatically updated.

Further, after the network connection is established between the smart device and the network access device, the backup connection is disconnected between the smart device and the network access device in order to avoid occupying the resource, so that other smart devices can establish the backup connection with the network access device.

The various technical features in the above embodiments can be arbitrarily combined, as long as there is no conflict or contradiction in the combinations of the features, which is not described in detail herein. Therefore, the arbitrary combination of the various technical features in the above embodiments falls within the scope of the present disclosure.

Next, an example of a network connection method may be described from the network access device side.

Figure 3:
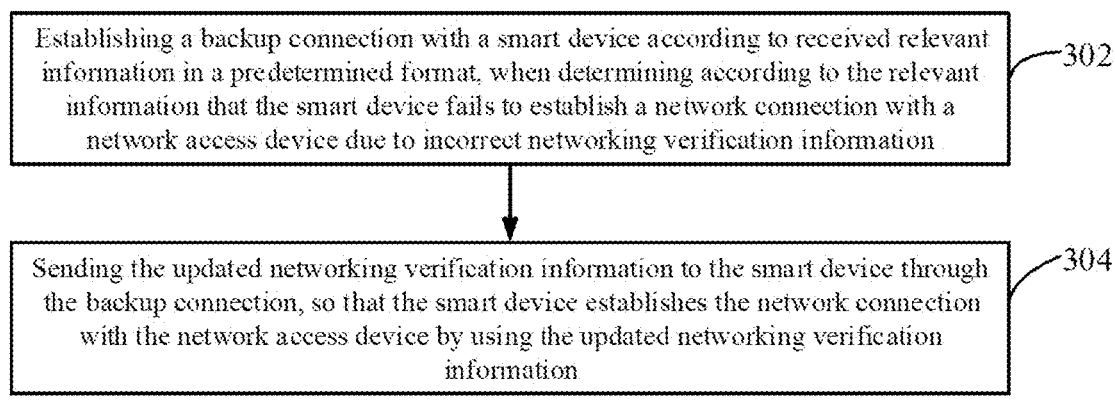
FIG. 3 is a schematic diagram of another network connection method according to some embodiments.

FIG. 3 is a schematic diagram of another network connection method according to an exemplary embodiment of the present disclosure. As shown in FIG. 3, the method includes:

step 302, establishing a backup connection with a smart device according to received relevant information in a predetermined format, when determining according to the relevant information that the smart device fails to establish a network connection with a network access device due to incorrect networking verification information, wherein the backup connection is a communication connection different from the network connection; and step 304, sending updated networking verification information to the smart device through the backup connection, so that the smart device establishes the network connection with the network access device by using the updated networking verification information.

In some embodiments, the method may be applied to a network access device, and the network access device may be a routing device or the like.

After the smart device is disconnected from the network access device, it can send relevant information in a predetermined format. If the current execution terminal, according to the received relevant information in the predetermined format, determines that the smart device cannot establish the network connection with the network access device due to incorrect networking verification information, it establishes the backup connection with the smart device according to the relevant information.

The backup connection is a communication connection different from the network connection. For example, the backup connection includes a short-range communication connection. The short-range communication connection may be a Bluetooth connection, so that when the smart device cannot establish the network connection with the network access device due to the incorrect networking verification information, the network access device establishes the Bluetooth connection with the smart device to communicate with the smart device.

The backup connection may be established between the smart device and the network access device by initiating a backup connection establishment request by the smart device or the network access device. In the embodiment, it will be illustrated by taking that the relevant information is broadcasted by the smart device as an example. The predetermined format is used to characterize that the broadcast is initiated when the smart device cannot establish the network connection with the network access device due to the incorrect networking verification information, so that the network access device establishes the backup connection with the smart device according to the relevant information when receiving the relevant information in the predetermined format, so as to prevent the network access device from mistakenly connecting an unrelated smart device.

For example, the relevant information in the predetermined format may refer to that the relevant information carries a specified identifier. The specified identifier may be used to indicate that the relevant information is initiated when the smart device can not establish the network connection with the network access device due to the incorrect network verification information. It should be understood that the relevant information in the predetermined format may be in another manner as long as the network access device can distinguish the relevant information sent under different conditions, which is not limited herein.

In some scenarios, some illegal users may use the network without authority through the smart device. For this reason, the network access device may verify validity of the smart device before the network access device sends the updated networking verification information to the smart device. Only when the verification is passed, the network access device sends the updated networking verification information to the smart device. In some embodiments, the method may further include: receiving identifier information fed back by a server side in synchronization with that the smart device receives the identifier information, before the network connection established by using the networking verification information is disconnected between the smart device and the network access device; and verifying validity of the smart device by using the identifier information, before sending the updated networking verification information to the smart device through the backup connection.

This process can be used as a precondition of that the network access device sends the updated networking verification information to the smart device. The smart device may be configured to be connected to the network access device by using networking verification information to access the network, and then can interact with the server side. When the smart device is legitimate, the server side can periodically synchronize the identifier information to the smart device and the network access device. The identifier information is used to verify the validity of the smart device. In one example, the identifier information may be Token. In the Internet of Things scenario, the server side can determine whether the smart device is legitimate by verifying whether the smart device and the network access device belong to the same account, and then determine whether to periodically synchronize the identifier information to the network access device and the smart device. It can be understood that other means can also be used to verify whether the smart device is legitimate, for example, to verify whether the smart device is legitimate by determining whether the identifier of the smart device exists in a pre-stored set of legitimate identifiers, which is not limited herein.

In one example, the request sent by the smart device to obtain the updated networking verification information may carry the identifier information. After receiving the request carrying the identifier information, the current execution terminal may use the identifier information to verify the validity of the smart device.

In another example, in order to ensure the security of the request, the smart device may use the identifier information to encrypt the request, so that the request is obtained through encryption using the identifier information. After receiving the encrypted request, the current execution terminal can decrypt the encrypted request using the identifier information.

After verifying that the smart device is legitimate, the network access device may send the updated networking verification information to the smart device, so that the smart device uses the updated networking verification information to establish the network connection with the network access device.

In one example, in order to ensure the security of the updated networking verification information, the updated networking verification information may be encrypted using the identifier information and transmitted to the smart device. The smart device decrypts the encrypted information, and establishes the network connection with the network access device using the decrypted information to access the network. Therefore, the networking verification information is automatically updated.

The various technical features in the above embodiments can be arbitrarily combined, as long as there is no conflict or contradiction in the combinations of the features, which is not described in detail herein. Therefore, the arbitrary combination of the various technical features in the above embodiments falls within the scope of the present disclosure.

Next, an example of updating the networking verification information will be described in conjunction with a network connection system. It should be understood that, relevant technologies in FIG. 4 that are the same to that in FIGS. 2 and 3 are not repeated herein.

Figure 4:
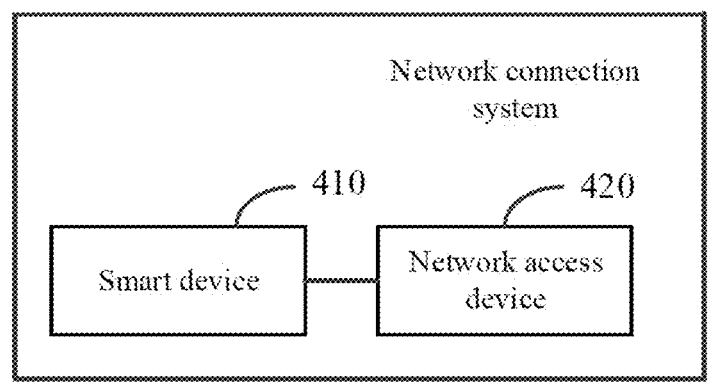
FIG. 4 is a schematic structural diagram of a network connection system according to some embodiments.

FIG. 4 is a schematic structural diagram of a network connection system according to an exemplary embodiment of the present disclosure. As shown in FIG. 4, the system includes a smart device 410 and a network access device 420. If the smart device 410 cannot establish a network connection with the network access device 420 due to incorrect networking verification information, a backup connection is established between the smart device 410 and the network access device 420. The backup connection is a communication connection different from the network connection. The network access device 420 sends an updated networking verification information to the smart device 410. The smart device 410 establishes the network connection with the network access device 420 using the updated networking verification information.

In this embodiment, the smart device and the network access may communicate with each other through another connection method when the smart device fails to establish the network connection with the network access device due to incorrect networking verification information, so that the network access device may send the updated networking verification information to the smart device, and thus the smart device can establish the network connection with the network access device by using the updated networking verification information. Therefore, the smart device can automatically access the network when the networking verification information is updated.

Figure 5:
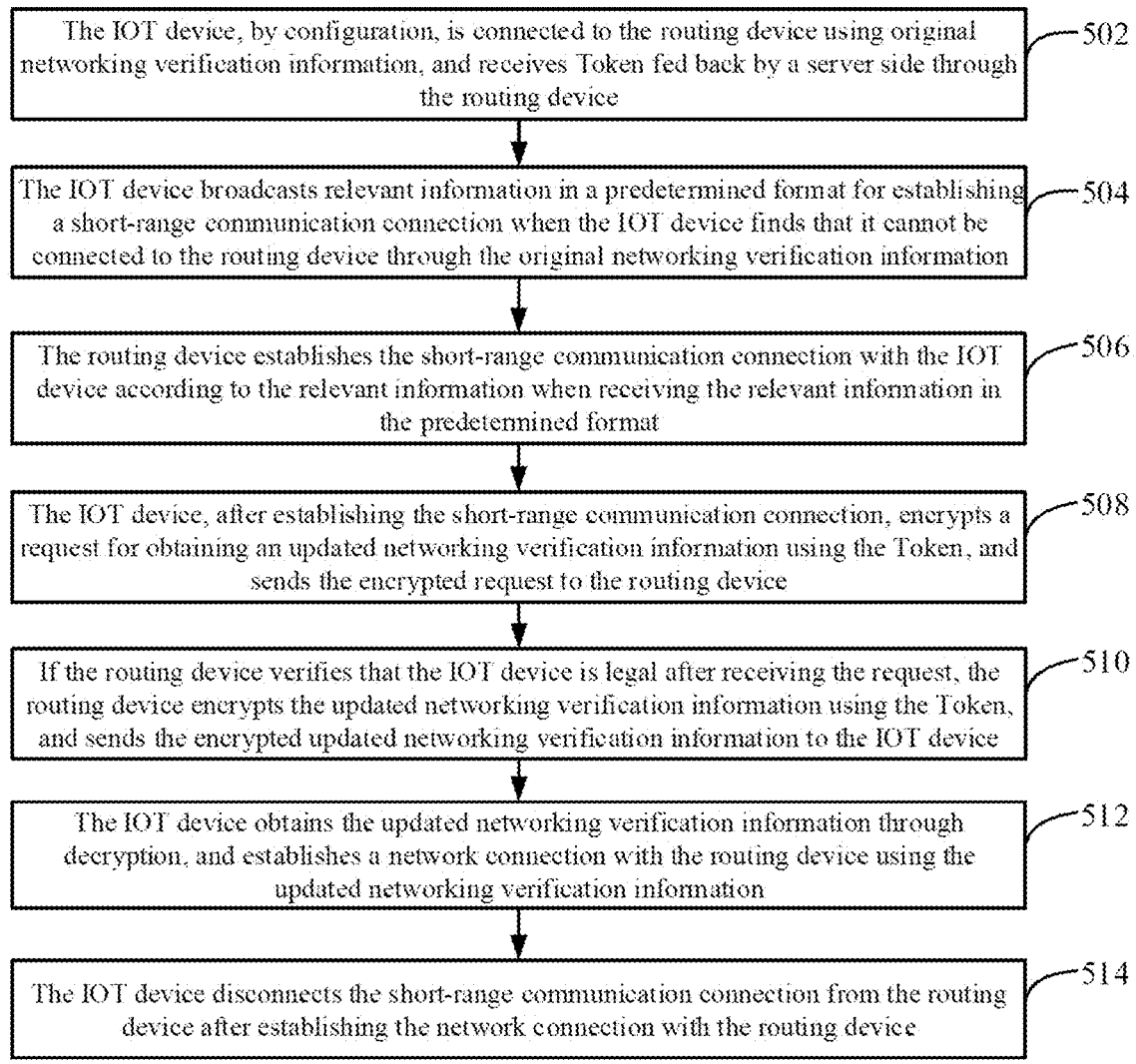
FIG. 5 is a schematic diagram of a method for connecting an Internet of Things device to a routing device according to some embodiments.

In addition, the present disclosure will be illustrated in a particular embodiment by also taking the Internet of Things scenario as an example. FIG. 5 is a schematic diagram of a method for connecting an Internet of Things device to a routing device according to an exemplary embodiment of the present disclosure. As shown in FIG. 5, the method includes the following steps.

In step 502, the IOT device, by configuration, is connected to the routing device using original networking verification information, and receives Token fed back by a server side through the routing device.

The original networking verification information may include SSID and connection password of the network (such as SSIDA and PWDA). The IOT device accesses the Internet of Things through the routing device and interacts with a server side. The IOT device and the routing device belong to a same account and may be synchronized periodically with the Token, and the Token can be stored on the IOT device.

In step 504, the IOT device broadcasts relevant information in a predetermined format for establishing a short-range communication connection when the IOT device finds that it cannot be connected to the routing device through the original networking verification information.

When a user modifies the SSID or connection password of the routing device, and the updated networking verification information is SSIDB and PWDB, the IOT device cannot access the routing device through the original SSIDA and PWDA after the routing device updates the configuration. After the IOT finds that it cannot be connected to the routing device, the IOT device can send a broadcast such as a Bluetooth broadcast to surroundings in a specific format.

In step 506, the routing device establishes the short-range communication connection with the IOT device according to the relevant information when receiving the relevant information in the predetermined format.

In step 508, the IOT device, after establishing the short-range communication connection, encrypts a request for obtaining an updated networking verification information using the Token, and sends the encrypted request to the routing device.

In step 510, if the routing device verifies that the IOT device is legitimate after receiving the request, the routing device encrypts the updated networking verification information using the Token, and sends the encrypted updated networking verification information to the IOT device.

In step 512, the IOT device obtains the updated networking verification information through decryption, and establishes a network connection with the routing device using the updated networking verification information. Therefore, the IOT device is connected to the IOT, and the updating of the SSID and password is completed automatically.

In step 514, the IOT device disconnects the short-range communication connection from the routing device after establishing the network connection with the routing device.

In the embodiment of the present disclosure, when the SSID or password of the routing device is modified, the IOT device supporting WIFI is automatically synchronized. At the same time, it can solve the problem that new SSID or password cannot be received by the IOT device when the password or name of the routing device is modified and the IOT device is not online.

For the foregoing method embodiments, a series of action combinations is described for easy description, but those skilled in the art should know that the present disclosure is not limited by the order of actions described. In the present disclosure, some steps can be performed in other order or simultaneously.

Further, those skilled in the art should also know that the embodiments described in the specification are all optional embodiments, and the actions and modules involved may not be necessary in the present disclosure.

Corresponding to the foregoing embodiments of the network connection method, the present disclosure also provides embodiments of a network connection device, an apparatus to which the device is applied, and a storage medium.

Figure 6:
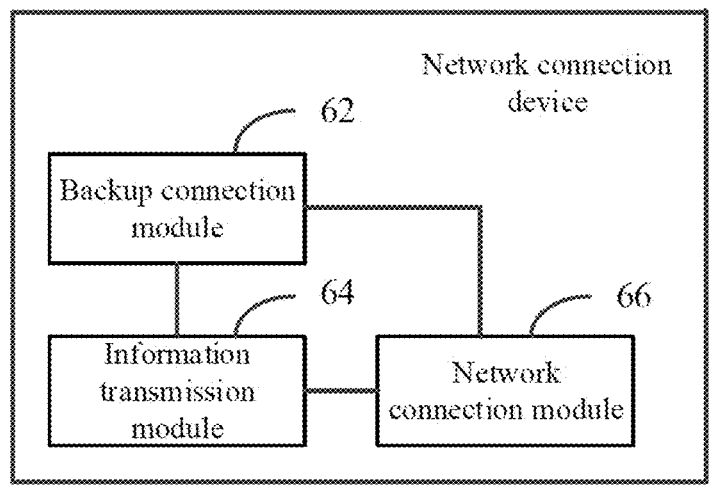
FIG. 6 is a block diagram of a network connection device according to some embodiments.

FIG. 6 is a block diagram of a network connection device according to an exemplary embodiment of the present disclosure. As shown in FIG. 6, the device includes:

a backup connection module 62, configured to establish a backup connection between a smart device and a network access device when the smart device fails to establish a network connection with the network access device due to incorrect networking verification information, wherein the backup connection is a communication connection different from the network connection;

an information transmission module 64, configured to receive updated networking verification information sent by the network access device through the backup connection; and a network connection module 66, configured to establish the network connection with the network access device by using the updated networking verification information.

In some embodiments, the networking verification information includes one or more of a wireless network SSID and a wireless network connection password.

In some embodiments, the backup connection includes a short-range communication connection.

In some embodiments, the backup connection module 62 is specifically configured to:

broadcast relevant information in a predetermined format for establishing the backup connection, so that the network access device establishes the backup connection with the smart device according to the relevant information when detecting the relevant information in the predetermined format.

In some embodiments, the device further includes an identifier synchronization module (not shown in FIG. 6), configured to receive identifier information in synchronization with that the network access device receives the identifier information, before the network connection established by using the networking verification information is disconnected between the smart device and the network access device. The identifier information is fed back by a server side, and is configured for the network access device to verify validity of the smart device before the network access device sends the updated networking verification information to the smart device.

In some embodiments, the information transmission module 64 is further configured to: send, to the network access device, a request for obtaining the updated networking verification information, before receiving the updated networking verification information sent by the network access device through the backup connection. The request is encrypted by using the identifier information or carries the identifier information.

In some embodiments, the updated networking verification information is encrypted using the identifier information.

In some embodiments, the backup connection module 62 is further configured to disconnect the backup connection with the network access device, after establishing the network connection with the network access device.

Figure 7:
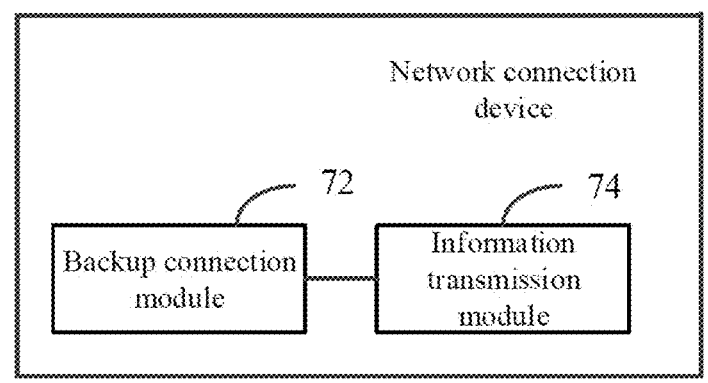
FIG. 7 is a block diagram of another network connection device according to some embodiments.

FIG. 7 is a block diagram of another network connection device according to an exemplary embodiment of the present disclosure. As shown in FIG. 7, the device includes:

a backup connection module 72, configured to establish a backup connection with a smart device according to received relevant information in a predetermined format, when it is determined according to the relevant information that the smart device fails to establish a network connection with a network access device due to incorrect networking verification information, wherein the backup connection is a communication connection different from the network connection; and an information transmission module 74, configured to send updated networking verification information to the smart device through the backup connection, so that the smart device establishes the network connection with the network access device by using the updated networking verification information.

In some embodiments, the device further includes an identifier synchronization module (not shown in FIG. 7), which is configured to receive identifier information fed back by a server side in synchronization with that the smart device receives the identifier information, before the network connection established by using the networking verification information is disconnected between the smart device and the network access device.

The device further includes a verifying module (not shown in FIG. 7), which is configured to verify validity of the smart device by using the identifier information, before the updated networking verification information is sent to the smart device through the backup connection.

In some embodiments, the updated networking verification information is encrypted using the identifier information.

For specific details of the implementation process of the functions and actions of each module in the above device, please refer to the implementation process of the corresponding steps in the above method, which will not be repeated herein.

For the device embodiment, since it basically corresponds to the method embodiment, the relevant part can be referred to the description of the method embodiment. The device embodiments described above are only schematic, wherein the modules described as separate components may or may not be physically separated, and the components displayed as modules may or may not be physical modules, that is, may be located in the same place, or may be distributed on multiple network modules. Some or all of the modules may be selected according to actual needs to achieve the objectives of the disclosed solutions. Those of ordinary skill in the art can understand and implement the same without paying creative labor.

In another aspect, the present disclosure also provides a smart device, including a processor and memory for storing executable instructions of the processor. The instructions, when being executed by the processor, cause the processor to implement the steps in the network connection method of the smart device side.

In another aspect, the present disclosure also provides a network access device, including a processor and a memory for storing executable instructions of the processor. The instructions, when being executed by the processor, cause the processor to implement the steps in the network connection method of the network access device side.

In another aspect, the present disclosure also provides a computer-readable storage medium having stored thereon computer programs that, when being executed by a processor, cause the processor to implement the steps of any of the above-mentioned methods.

Various embodiments of the present disclosure can take the form of a computer program product implemented on one or more storage media (including but not limited to disk storage, CD-ROM, optical storage and the like) including program codes. Computer-usable storage media include permanent and non-permanent, removable and non-removable media, and information storage can be achieved by any method or technology. The information may be computer readable instructions, data structures, modules of programs, or other data. Examples of computer storage media include but are not limited to: phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disc (DVD) or other optical storage, magnetic tape cassettes, magnetic tape magnetic disk storage or other magnetic storage devices or any other non-transmission media, which can be used to store information that can be accessed by computing devices.

Figure 8:
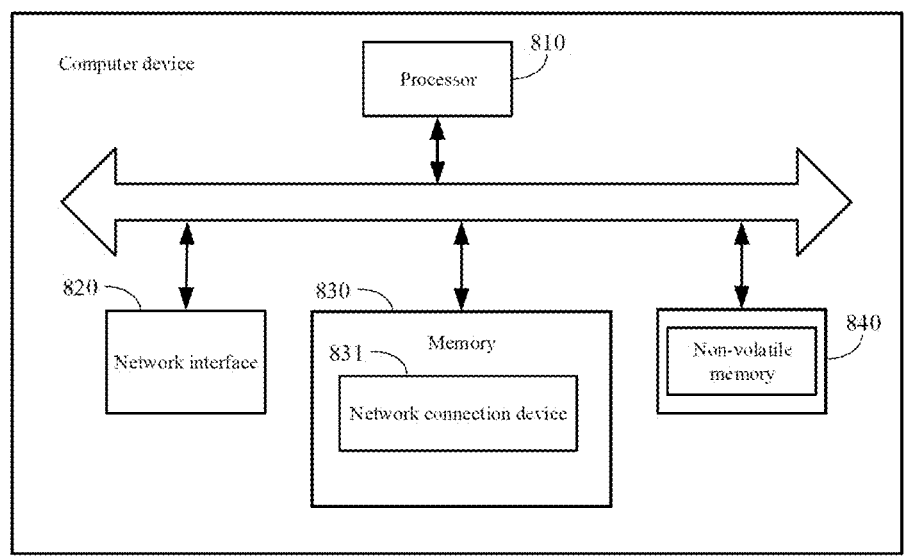
FIG. 8 is a hardware structure diagram of a computer device where a network connection device is located according to an exemplary embodiment of the present disclosure.

Various embodiments of the network connection device of the present disclosure can be applied to a computer device, such as a smart device or a network access device. The device embodiments may be implemented by software, hardware or a combination of hardware and software. Taking software implementation as an example, a device in a logical sense is formed by reading corresponding computer program instructions in a non-volatile memory into a memory to be executed through a processor for file processing. In terms of hardware, FIG. 8 shows a hardware structure diagram of a computer device where the network connection device is located according to an embodiment of the present disclosure. In addition to a processor 810, memory 830, network interface 820, and non-volatile memory 840, in the embodiment, the device where the network connection device 831 is located may generally include other hardware according to the actual function of the computer device, which will not be described in detail herein.

Various embodiments of the present disclosure can have one or more of the following advantages.

The smart device can establish the backup connection with the network access device when the smart device fails to establish the network connection with the network access device due to incorrect networking verification information, receives the updated networking verification information sent by the network access device through the backup connection and then establishes the network connection with the network access device by using the updated networking verification information. Therefore, the networking verification information in the smart device is updated automatically, and the network connection is established automatically between the smart device and the network access device, which does not need user participation, and thus is simple in operation and saves time.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A network connection method, comprising:
   establishing a backup connection between a smart device and a network access device when the smart device fails to establish a network connection with the network access device due to incorrect networking verification information, wherein the backup connection is a communication connection different from the network connection;
   receiving updated networking verification information sent by the network access device through the backup connection; and
   establishing the network connection with the network access device by using the updated networking verification information; wherein the establishing a backup connection between a smart device and a network access device comprises:
   broadcasting relevant information in a predetermined format for establishing the backup connection, so that the network access device establishes the backup connection with the smart device according to the relevant information when detecting the relevant information in the predetermined format; and
   wherein the relevant information carries a specified identifier, and the specified identifier is used for indicating that the relevant information is initiated when the smart device fails to establish the network connection with the network access device due to the incorrect verification information.

2. The network connection method according to claim 1, wherein the networking verification information comprises one or more of a wireless network service set identifier (SSID) and a wireless network connection password.

3. The network connection method according to claim 1, further comprising:
   receiving identifier information in synchronization with that the network access device receives the identifier information, before the network connection established by using the networking verification information is disconnected between the smart device and the network access device,
   wherein the identifier information is fed back by a server side, and is configured for the network access device to verify validity of the smart device before the network access device sends the updated networking verification information to the smart device.

4. The network connection method according to claim 3, further comprising:
   sending, to the network access device, a request for obtaining the updated networking verification information, before receiving the updated networking verification information sent by the network access device through the backup connection,
   wherein the request is encrypted by using the identifier information or carries the identifier information.

5. The network connection method according to claim 1, further comprising:
   disconnecting the backup connection with the network access device, after establishing the network connection with the network access device.

6. A smart device implementing the network connection method of claim 1, wherein the smart device comprises at least one of a mobile terminal and a smart home device.

7. An Internet of Things (IoT) system comprising the smart device of claim 6, further comprising the network access device.

8. The IoT system of claim 7, wherein the network access device is configured to:
   receive relevant information broadcast by the smart device in a predetermined format, wherein the relevant information carries a specified identifier, and the specified identifier is used for indicating that the relevant information is initiated when the smart device fails to establish a network connection with a network device due to incorrect network verification information;
   establish the backup connection with the smart device according to received relevant information in the predetermined format, wherein the backup connection is the communication connection different from the network connection; and
   send updated networking verification information to the smart device through the backup connection, so that the smart device establishes the network connection with the network access device by using the updated networking verification information.

9. The IoT system of claim 8, wherein the networking verification information in the smart device is updated automatically, and the network connection is established automatically between the smart device and the network access device without user participation.

10. A network connection method, comprising:
    receiving relevant information broadcast by a smart device in a redetermined format wherein the relevant information carries a specified identifier, and the specific identifier is used for indicating that the relevant information is initiated when the smart device fails to establish a network connection with a network device due to incorrect network verification information;
    establishing a backup connection with the smart device according to the received relevant information in the predetermined format, wherein the backup connection is a communication connection different from the network connection; and
    sending updated networking verification information to the smart device through the backup connection, so that the smart device establishes the network connection with the network access device by using the updated networking verification information.

11. The network connection method according to claim 10, further comprising:

receiving identifier information fed back by a server side in synchronization with that the smart device receives the identifier information, before the network connection established by using the networking verification information is disconnected between the smart device and the network access device; and verifying validity of the smart device by using the identifier information, before sending the updated networking verification information to the smart device through the backup connection.

12. A network access device implementing the network connection method of claim 10, comprising:

a processor; and memory having instructions stored therein executable by the processor, wherein the instructions, when being executed by the processor, cause the processor to implement steps of the network connection method.

13. The network access device according to claim 12, wherein the network connection method further comprises:

receiving identifier information fed back by a server side in synchronization with that the smart device receives the identifier information, before the network connection established by using the networking verification information is disconnected between the smart device and the network access device; and verifying validity of the smart device by using the identifier information, before sending the updated networking verification information to the smart device through the backup connection.

14. A smart device, comprising:

a processor; and memory having instructions stored therein executable by the processor, wherein the instructions, when being executed by the processor, cause the processor to implement a network connection method comprising:

establishing a backup connection between a smart device and a network access device when the smart device fails to establish a network connection with the network access device due to incorrect networking verification information, wherein the backup connection is a communication connection different from the network connection;

receiving updated networking verification information sent by the network access device through the backup connection; and establishing the network connection with the network access device by using the updated networking verification information; wherein the establishing a backup connection between a smart device and a network access device comprises:

broadcasting relevant information in a predetermined format for establishing the backup connection, so that the network access device establishes the backup connection with the smart device according to the relevant information when detecting the relevant information in the predetermined format; and wherein the relevant information carries a specified identifier, and the specified identifier is used for indicating that the relevant information is initiated when the smart device fails to establish the network connection with the network access device due to the incorrect verification information.

15. The smart device according to claim 14, wherein the networking verification information comprises one or more of a wireless network service set identifier (SSID) and a wireless network connection password.

16. The smart device according to claim 14, wherein the network connection method further comprises:

receiving identifier information in synchronization with that the network access device receives the identifier information, before the network connection established by using the networking verification information is disconnected between the smart device and the network access device, wherein the identifier information is fed back by a server side, and is configured for the network access device to verify validity of the smart device before the network access device sends the updated networking verification information to the smart device.

17. The smart device according to claim 16, wherein the network connection method further comprises:

sending, to the network access device, a request for obtaining the updated networking verification information, before receiving the updated networking verification information sent by the network access device through the backup connection, wherein the request is encrypted by using the identifier information or carries the identifier information.

18. The smart device according to claim 14, wherein the network connection method further comprises:

disconnecting the backup connection with the network access device, after establishing the network connection with the network access device.

* * * * *